V. J. ODHNER.
CALCULATING MACHINE.
APPLICATION FILED JUNE 11, 1919.
1,387,608.
Patented Aug. 16, 1921.
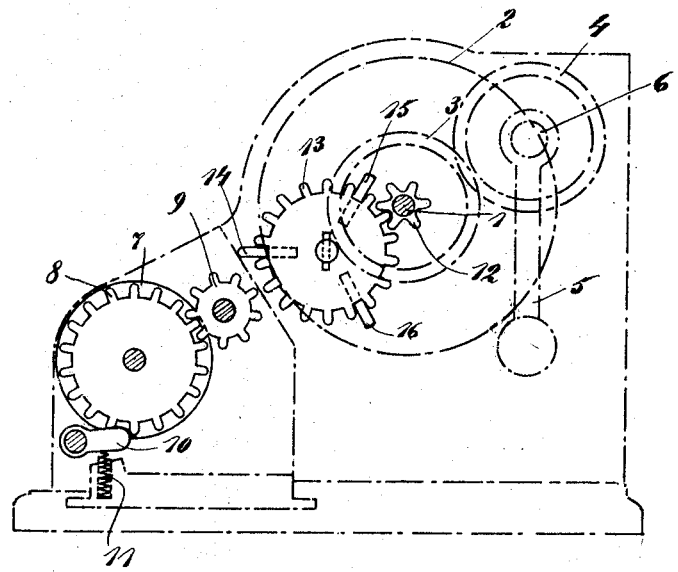
Inventor
V. J. Odhner
By H. R. Kerslake
Atty.

UNITED STATES PATENT OFFICE.

VALENTIN JAKOB ODHNER, OF STOCKHOLM, SWEDEN.

CALCULATING-MACHINE.

1,387,608.  Specification of Letters Patent.  Patented Aug. 16, 1921.

Application filed June 11, 1919. Serial No. 303,412.

*To all whom it may concern:*

Be it known that I, VALENTIN JAKOB ODHNER, a subject of the King of Sweden, and resident of Karlaplan 2, Stockholm, in the Kingdom of Sweden, have invented certain new and useful Improvements in Calculating-Machines, of which the following is a specification, reference being had therein to the accompanying drawing.

In calculating machines of the type described in Patent No. 514,725, granted February 13, 1894, the number of rotations of the so-called calculating wheels for effecting a calculation, for instance the multiplying of two numbers, generally is indicated by a toothed wheel, provided on the shaft of the calculating wheels, continuously rotating a toothed wheel through one revolution for each revolution of the said shaft, the toothed wheel last mentioned being provided with an arm, which actuates a toothed wheel, meshing with a disk, provided with teeth and on its peripherical surface with figures visible by turns through an opening in the casing of the machine. The said arm is adapted to turn the said indicating disk only one step or tooth for each revolution of the calculating wheels, but, owing to the fact that the toothed wheel carrying the arm is rotated at the same speed as the shaft of the calculating wheels and the latter is rotated very rapidly during the calculating operation, it sometimes happens that such a great momentum is imparted to the indicating disk when shifted, that it continues rotating for a greater distance than the intended step or tooth, which results in a wrong indication and in the arm not engaging its wheel properly during the next revolution.

The object of this invention is to remove the said disadvantage.

The accompanying drawing shows as an example one form of execution of the invention. The drawing shows in a side view only so much of the calculating machine as is necessary to illustrate the invention.

1 is the shaft of the calculating wheels and 2 designates one of the said wheels. The said shaft is rotated as usually by means of a shaft 6, rotated manually by a handle 5 and a gearing 3, 4. 7 is a disk provided on its peripheral surface with figures and with teeth 8, meshing with a toothed wheel 9. The said disk 7 is locked in its position by a pawl 10 acted upon by a spring 11. For the rotating of the indicating wheel one step or one tooth a smaller toothed wheel or pinion 12 according to this invention is provided on the shaft 1 meshing with a larger toothed wheel 13. The diameters of the wheels 12 and 13 are so adapted, that during one revolution of the shaft 1 and the pinion 12, the wheel 13 is rotated for one third of a revolution. In order that, nevertheless, the indicating disk 7 may be rotated one step for each revolution of the calculating wheels the wheel 13 is provided with three arms 14, 15, 16. One (14) of the said arms engages the toothed wheel 9 during one revolution of the calculating wheels and rotates the same for such an angle, that the wheel 9 by its turn rotates the indicating disk 7 one step. During the next revolution of the calculating wheels the subsequent arm 15 engages the toothed wheel 9 and rotates the indicating disk a further step and so on. Owing to the fact that the velocity of the toothed wheel 13 is only one third of the velocity of the shaft of the calculating wheels, the arms 14, 15 and 16 impart to the indicating disk 7 only a slight momentum, which in no case becomes so great, that the indicating disk is rotated more than the desired step. The diameters of the wheels 12 and 13 may, evidently, differ from those shown in the drawing but the number of teeth of the wheel 13 is always an even multiple of the number of teeth of the pinion 12. The machine may also be so arranged, that the arms of the wheel 13 actuate directly the indicating disk.

Having now described my invention, what I claim as new and desire to secure by Letters Patent is:

Mechanism for indicating the number of operations of a machine comprising an element operated the same distance at each operation of the machine, a reducing gear wheel connected thereto, a larger gear wheel engaging the reducing gear and having projecting teeth, the ratio of said gearing being so adapted that the larger gear is turned for only a portion of a revolution during a complete revolution of said element, an indicator, a wheel normally out of gear with the other gear wheels but operable by the projecting teeth at each operation of the machine to operate the indicator whereby the indicator may be gently moved without over throw and only at the end of the operation of the machine.

In witness whereof I have hereunto signed my name.

VALENTIN JAKOB ODHNER.